United States Patent
You et al.

(10) Patent No.: US 11,796,122 B2
(45) Date of Patent: Oct. 24, 2023

(54) DISPLAY MOUNT AND METHOD OF INSTALLATION

(71) Applicant: NINGBO ERGOVIDA HEALTH TECHNOLOGY, LTD, Ningbo (CN)

(72) Inventors: Xiaodong You, Ningbo (CN); Junmin Jin, Ningbo (CN); Weibin Jia, Ningbo (CN)

(73) Assignee: NINGBO ERGOVIDA HEALTH TECHNOLOGY LTD., Ningbo (CN)

( * ) Notice: Subject to any disclaimer, the term of this patent is extended or adjusted under 35 U.S.C. 154(b) by 0 days.

(21) Appl. No.: 17/128,977

(22) Filed: Dec. 21, 2020

(65) Prior Publication Data
US 2021/0190257 A1    Jun. 24, 2021

(30) Foreign Application Priority Data

Dec. 23, 2019    (CN) .......................... 201911333783.4

(51) Int. Cl.
*F16M 11/04* (2006.01)
*F16M 11/16* (2006.01)

(52) U.S. Cl.
CPC ........... *F16M 11/046* (2013.01); *F16M 11/16* (2013.01); *F16M 2200/027* (2013.01)

(58) Field of Classification Search
CPC ................. F16M 11/046; F16M 11/16; F16M 2200/027; F16M 11/22; F16M 11/041
USPC ......... 248/125.7, 122.1, 219.1–219.4, 218.4, 248/125.1, 917, 919–920
See application file for complete search history.

(56) References Cited

U.S. PATENT DOCUMENTS

| | | | | |
|---|---|---|---|---|
| 4,562,987 A | * | 1/1986 | Leeds | F16M 11/2014 248/920 |
| 8,905,249 B2 | * | 12/2014 | Whitacre | E04B 2/7416 248/218.4 |
| 2002/0011544 A1 | * | 1/2002 | Bosson | F16M 11/041 248/274.1 |
| 2006/0202091 A1 | * | 9/2006 | Oddsen | F16M 11/10 248/122.1 |
| 2008/0068784 A1 | * | 3/2008 | Bouissiere | F16M 11/22 361/679.07 |
| 2011/0101179 A1 | * | 5/2011 | Fritch | F16M 13/02 248/125.7 |
| 2013/0293719 A1 | * | 11/2013 | Ashe | F16M 13/04 348/157 |
| 2015/0146114 A1 | * | 5/2015 | Williams | B60R 19/48 348/837 |
| 2021/0072626 A1 | * | 3/2021 | Tippin | G03B 21/10 |

* cited by examiner

*Primary Examiner* — Christopher Garft
(74) *Attorney, Agent, or Firm* — Knobbe Martens Olson & Bear LLP (57) ABSTRACT

A TV mount and method of installation are described. The TV mount can include mount a mount body placed on a horizontal plane, and a hanging arm assembly for fixed connection with a TV. The hanging arm assembly is slidably fitted and radially constrained on the upper part of the mount body, and the upper part of the mount body is provided with adjusting and fixing members that constrain the axial sliding of the hanging arm assembly. The method can include installing the hanging arm assembly on the back of a TV, and lifting the TV, and muff-coupling at least one hanging arm of the assembly on the mount body.

6 Claims, 7 Drawing Sheets

DISPLAY MOUNT AND METHOD OF INSTALLATION

INCORPORATION BY REFERENCE TO ANY PRIORITY APPLICATIONS

This application claims priority to Chinese Patent Application No. 2019113337834, filed Dec. 23, 2019, which is incorporated herein by reference. Any and all applications for which a foreign or domestic priority claim is identified in the Application Data Sheet as filed with the present application are hereby incorporated by reference under 37 CFR 1.57.

BACKGROUND

This application relates to the technical field of mounts, and more particularly, to a television (TV) or other type of display mount and a method for installing a TV or display on the mount.

Some TV mounts may comprise a mount body placed on a horizontal plane and a hanging arm assembly for hanging a TV. The upper part of the mount body is fixed to the hanging arm assembly. When installing, the installer either connects the hanging arm assembly to the upper part of the mount body first, and then installs a TV on the hanging arm assembly, or connects the hanging arm assembly to a TV first, and then installs the hanging arm assembly on the upper part of the mount body. These types of installation technologies may have the following disadvantages: the above-mentioned TV mount needs to be installed by one person first, and then by two, and the installation is inconvenient and expensive.

SUMMARY

According to the present application, a TV mount is provided that is convenient to install and low in installation cost. A method of installing a TV on the TV mount is also described herein.

The technical solution of the present application is to provide a TV mount, comprising a mount body placed on a horizontal plane and a hanging arm assembly for fixed connection with a TV, wherein the hanging arm assembly is slidably fitted and radially constrained on the upper part of the mount body. The upper part of the mount body is provided with adjusting and fixing members that constrain the axial sliding of the hanging arm assembly.

In some embodiments, the hanging arm assembly that is slidably fitted and radially constrained on the upper part of the mount body refers to a hanging arm assembly that comprises a first hanging arm and a second hanging arm. The first hanging arm can be provided with a first annular member, an upper part of the mount body can be provided with a member used in conjunction with the first annular member, and the first annular member can be muff-coupled and slidably fitted on the member.

In some embodiments, a connecting member is provided on the second hanging arm, and it is fixed to the member.

In some embodiments, the connecting member comprises a first half-annular member and a second half-annular member located on the second hanging arm. One end of the first half-annular member is rotatably connected to one end of the second half-annular member. The other end of the first half-annular member is fixed to the other end of the second of the half-annular member.

In some embodiments, the inner annular shape enclosed by the first half-annular member and the second half-annular member matches the size and shape of the member.

In some embodiments, the adjusting and fixing member comprises a second annular member and a fixing member located on the mount body. The second annular member is muff-coupled and slidably fitted on the member. The fixing member, the second annular member, and the member are connected.

A method for installing a TV on the above-mentioned TV mount can include the following steps:
a. installing the hanging arm assembly on the back of a TV; and
b. lifting the TV, and muff-coupling at least one hanging arm of the assembly on the mount body.

The method may include the following step c after step b: connecting the other hanging arm of the assembly to the mount body.

The method may include the following step before step a or step b: installing an adjusting and fixing member on the mount body for position adjustment and fixing.

By adopting the above structure and method, the present application can provide advantages as compared to the existing technology as described in more detail below.

When installing a TV, the hanging arm assembly and the TV can be installed first, and then at least one hanging arm of the assembly needs to be muff-coupled on the mount body after being lifted to a fixed position. The TV mount only needs to be installed by one person, so the installation is convenient and low in cost.

BRIEF DESCRIPTION OF THE DRAWINGS

The features and advantages of the mounts and associated methods described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. The drawings may not be drawn to scale.

FIG. 5 is an installation diagram of an example installation step a.

DETAILED DESCRIPTION

A preferred embodiment of the present application will be described hereinafter with reference to the attached drawings.

Figure 1:
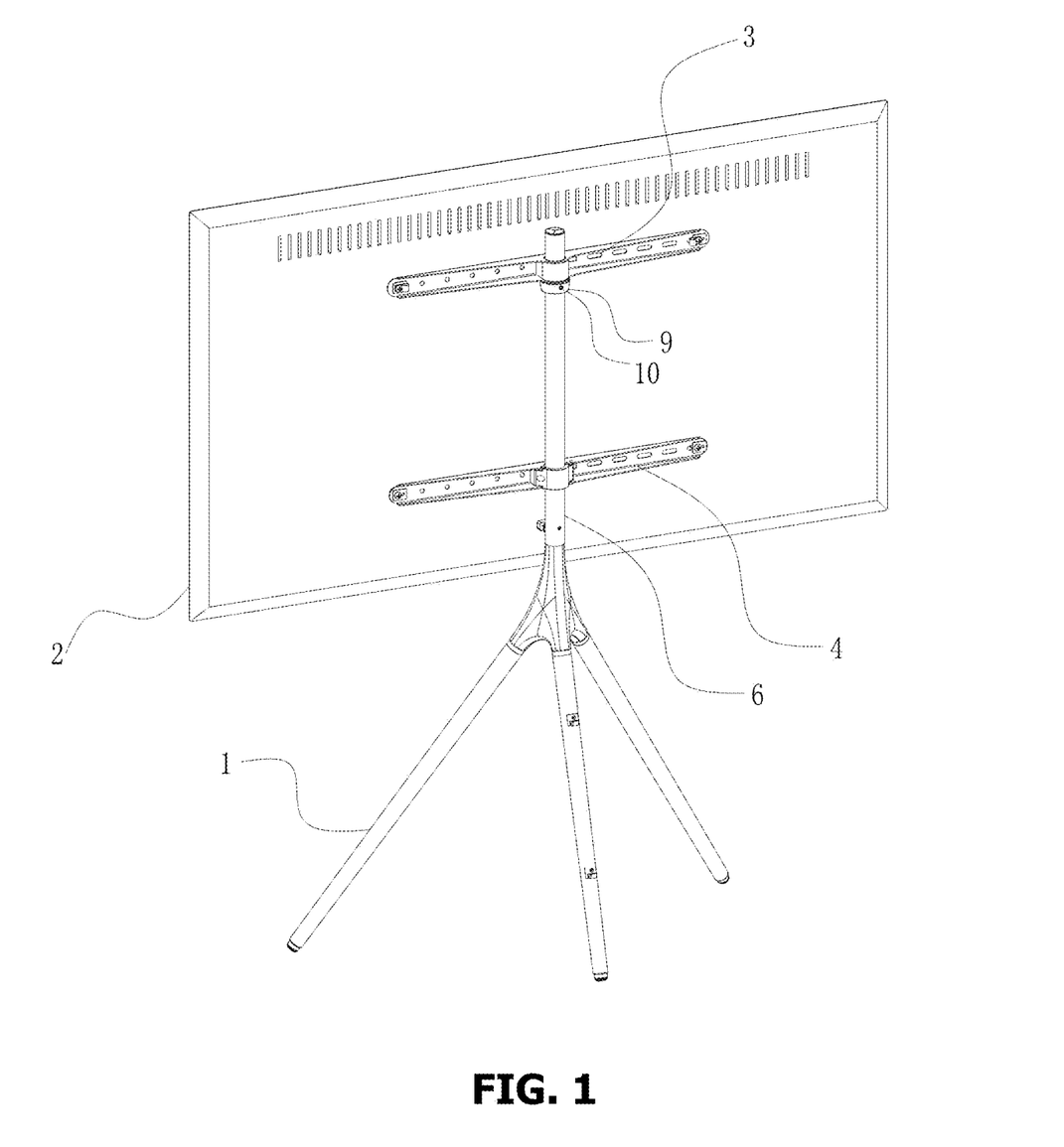
FIG. 1 is a rear perspective view of the TV mount (including TV) according to an embodiment.
Figure 5:
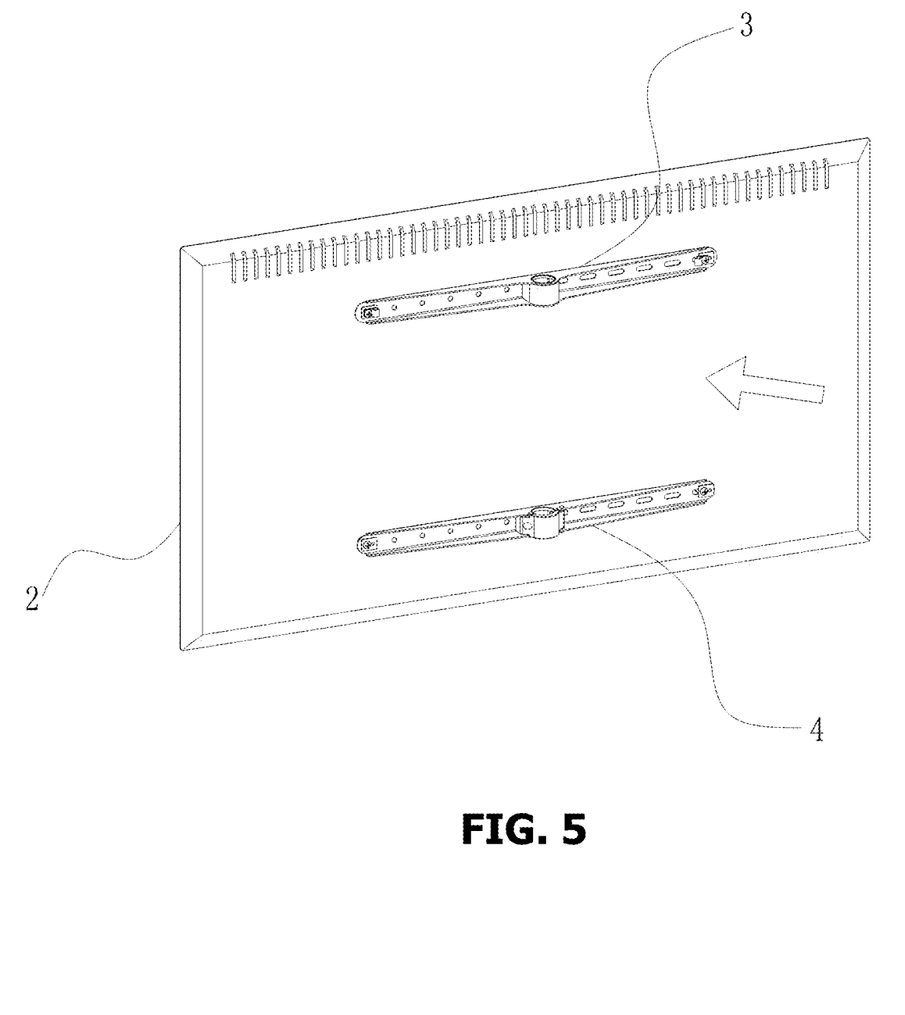
Figure 6:
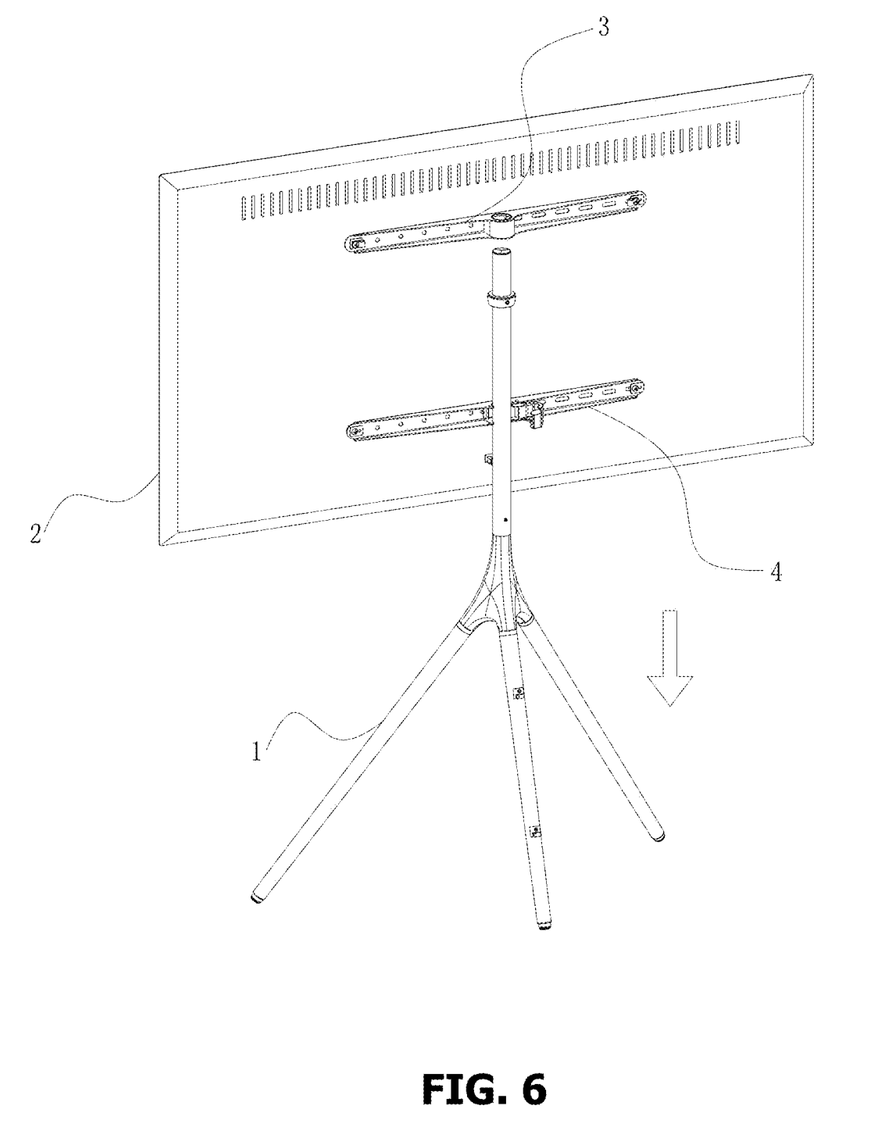
FIG. 6 is an installation diagram of an example installation step b.

The present application includes a method for installing a TV on a TV mount. The TV mount comprises a mount body 1 placed on a horizontal plane and a hanging arm assembly for fixed connection with the TV 2. The method can include the following steps:

a. There is a bracket through-hole at the back of the arm assembly. When installing the hanging arm assembly (including first and second hanging arms 3, 4) on the back of the TV 2, pass the bolt through the hole to connect the TV 2;

b. Lift the TV, and muff-couple at least one hanging arm 3, 4 of the assembly on the mount body 1. In this embodiment, the structure can be: as shown in FIG. 1, the hanging arm assembly is slidably fitted and radially constrained on the upper part of the mount body 1. The upper part of the mount body 1 is provided with adjusting and fixing members that constrain the axial sliding of the hanging arm assembly.

A TV mount can comprise a mount body 1 placed on a horizontal plane and a hanging arm assembly for fixed connection with a TV 2. The hanging arm assembly can be slidably fitted and radially constrained to the mount body 1 on the upper part of the mount body 1. The upper part of the mount body can be provided with adjusting and fixing members that constrain the axial sliding of the hanging arm assembly.

Figure 2:
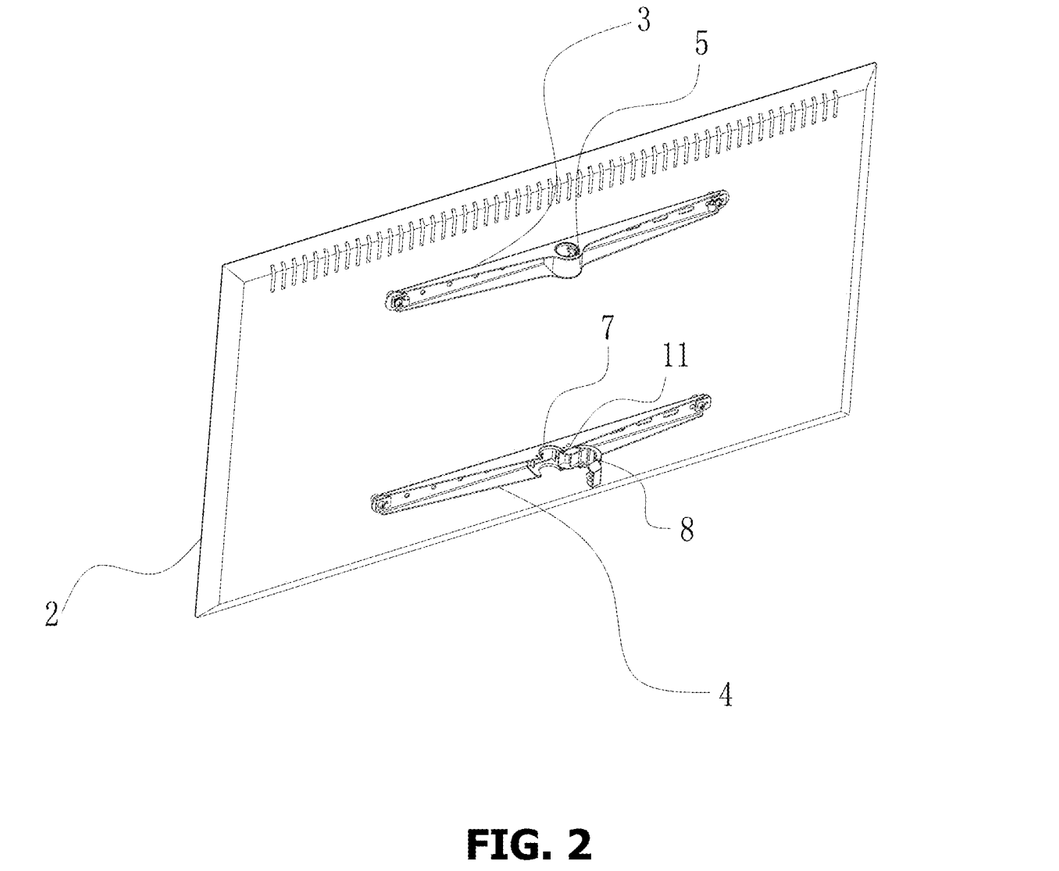
FIG. 2 is a rear perspective view illustrating a first method adoption of the TV mount (without the mount body).

As shown in FIG. 2, the hanging arm assembly slidably fitted and radially constrained on the upper part of the mount body 1 refers to: the hanging arm assembly comprising a first hanging arm 3 and a second hanging arm 4; the first hanging arm 3 is provided with a first annular member 5; the upper part of the mount body 1 is provided with a cylindrical member 6 used in conjunction with the first annular member 5; the first annular member 5 is muff-coupled and slidably fitted on the cylindrical member 6; the second hanging arm 4 is provided with a connecting member, and the connecting member is fixed to the cylindrical member 6, generally by a screw. The cylindrical member 6 can be cylindrical or square cylindrical, etc. And the corresponding inner annular member can be a cylindrical or square cylindrical hole, etc. The cylindrical member 6 can also be two or three.

Figure 3:
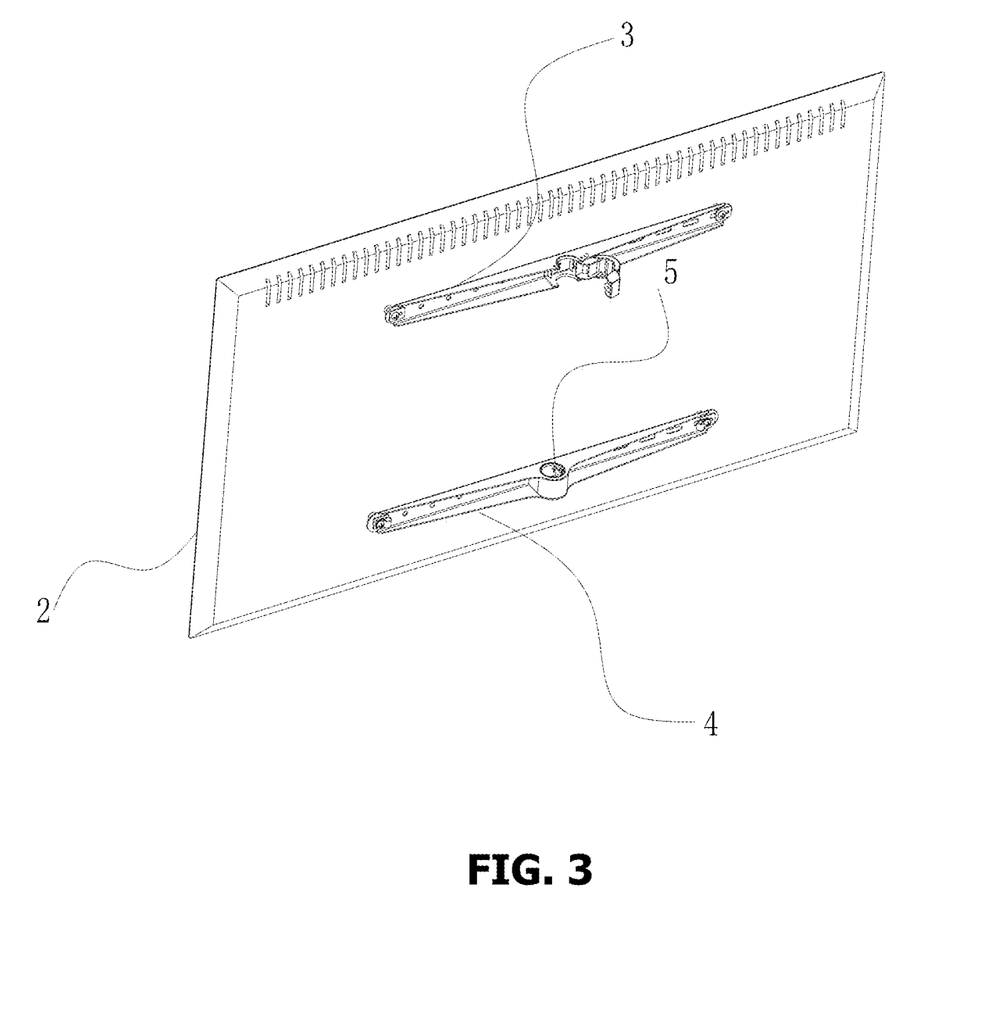
FIG. 3 is a rear perspective view illustrating a second method adoption of the TV mount (without the mount body).

As shown in FIG. 3, in this embodiment, the hanging arm assembly slidably fitted and radially constrained on the upper part of the mount body 1 also refers to: the hanging arm assembly comprising a first hanging arm 3 and the second hanging arm 4; the second hanging arm 4 is provided with a first annular member 5; the upper part of the mount body 1 is provided with a cylindrical member 6 used in conjunction with the first annular member 5; the first annular member 5 is muff-coupled and slidably fitted on the cylindrical member 6; the second hanging arm 4 is provided with a connecting member; the connecting member is fixed to the cylindrical member 6.

Figure 4:
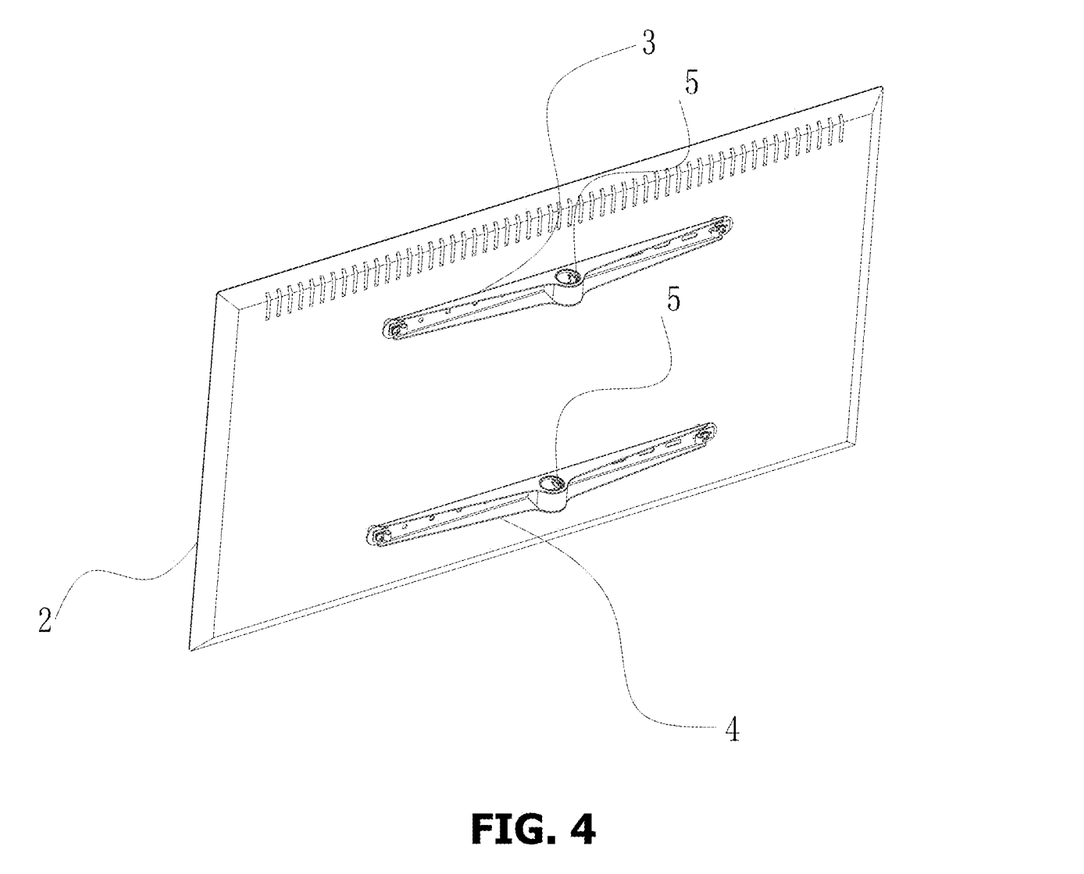
FIG. 4 is a rear perspective view illustrating a third method adoption of the TV mount (without the mount body).

As shown in FIG. 4, the hanging arm assembly slidably fitted and radially constrained on the upper part of the mount body 1 also refers to: the hanging arm assembly comprising a first hanging arm 3 and a second hanging arm 4; the first hanging arm 3 and the second hanging arm 4 are both provided with a first annular member 5; the upper part of the mount body 1 is provided with a cylindrical member 6 that used in conjunction with the first annular member 5; the first annular member 5 is muff-coupled and slidably fitted on the cylindrical member 6.

Figure 7:
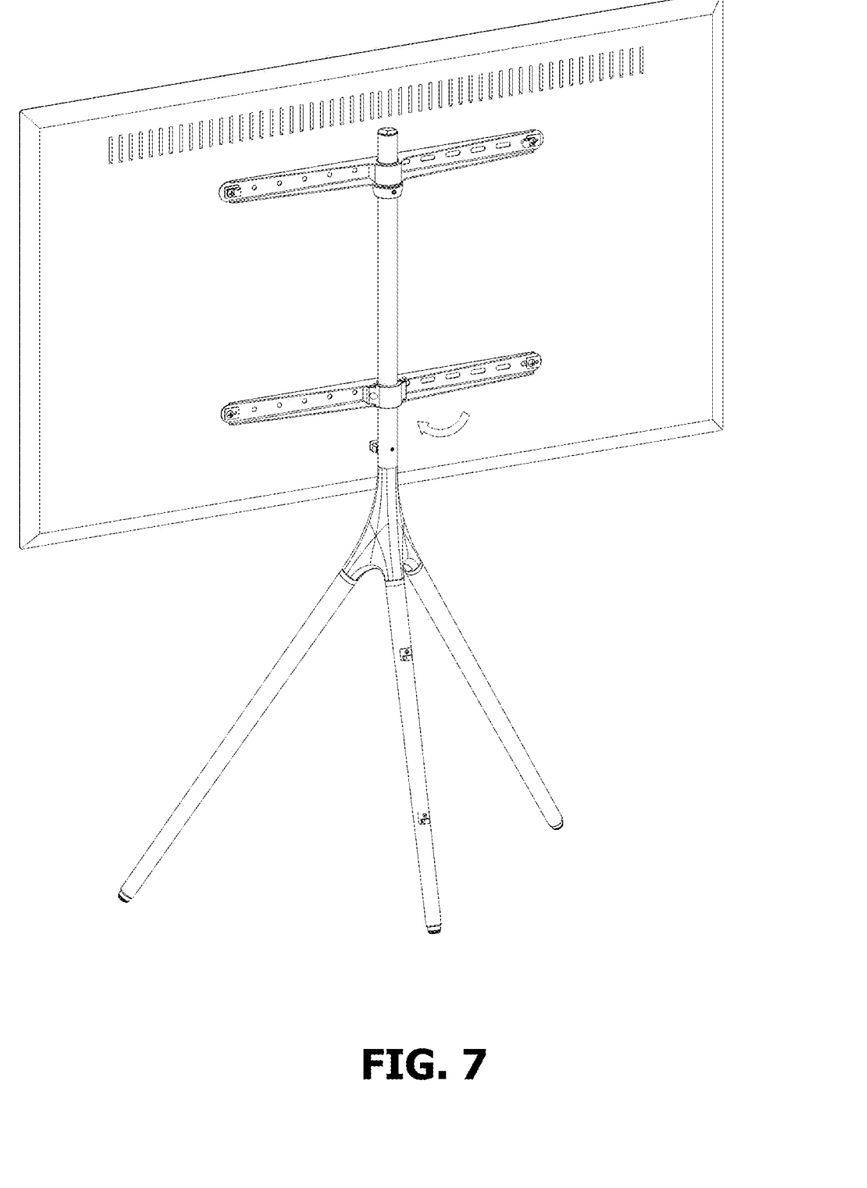
FIG. 7 is an installation diagram of an example installation step c.

The installation method can include the following step c after step b: connecting the other hanging arm in the assembly to the mount body 1. In this embodiment, the structure can be as follows: as shown in FIG. 2, the connecting member comprises a first half-annular member 7 and a second half-annular member 8 located on the second hanging arm 4. One end of the first half-annular member 7 is rotatably connected with one end of the second half-annular member 8. One end of the first half-annular member 7 is provided with a rotating shaft 11. And one end of the second half-annular member 8 is rotatably connected to the rotating shaft 11 enabling the second half-annular member 8 to rotate.

The other end of the first half-annular member 7 can be fixed to the other end of the second half-annular member 8. The connection can be generally a screw connection, and it also can be an inverted connection.

The inner annular shape enclosed by the first half-annular member 7 and the second half-annular member 8 can match the size and shape of the cylindrical member 6, that is, the first half-annular member 7 and the second half-annular member 8 are tightly fitted with the cylindrical member. In this embodiment, the inner annular shape enclosed by the first half-annular member 7 and the second half-annular member 8 is a cylindrical surface.

The installation method can include the following step before step a or step b: installing an adjusting and fixing member on the mount body 1 for position adjustment and fixing of the TV 2.

The adjusting and fixing member can comprise a second annular member 9 and a fixing member 10 located on the mount body 1. The second annular member 9 can be slidably fitted and radially constrained on the cylindrical member 6. The fixing member 10 can be connected to the second annular member 9 and the cylindrical member 6, namely, indirect in axial constraint.

The adjusting and fixing member can comprise a fixing member (not shown in the figure) used to constrain the axial downward direction of the first annular member 5. The fixing member is located on the cylindrical member 6, namely, the fixing member can be directly fixed by screws, etc., on the cylindrical member 6 for axial constraint.

The figures show the following elements: 1. mount body, 2. TV, 3. first hanging arm, 4. second hanging arm, 5. first annular member, 6. member, 7. first half-annular member, 8. second half-annular member, 9. second annular member, 10. connecting member, 11. rotating shaft.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, inter-changed or excluded from other embodiments.

The above description discloses several methods and materials of the present invention. This invention is suscep-tible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A method for installing a TV on a TV mount, the method comprising:

installing a first bracket on the rear portion of the TV by coupling the first bracket to the rear portion of the TV, wherein the first bracket comprises first annular member configured to be slidably fitted on a rod of a support stand of the TV mount such that such that the rod extends through an opening of the first annular member, and wherein the first annular member is fixedly closed;

installing a second bracket on the rear portion of the TV at a position vertically lower than the first bracket by coupling the second bracket to the rear portion of the TV, wherein the second bracket comprises a second annular member, wherein the second annular member is selectively openable such that, in a closed configuration, the second annular member can be closed around the rod;

installing a collar member on the rod of the support stand, wherein the rod comprises a vertically-oriented rod, wherein the collar member is positioned on the rod at a desired vertical height and fixedly secured to the rod to constrain axial movement of the collar member along the rod;

lifting the TV with the first bracket and the second bracket mounted thereon and the second annular member in an open configuration to a height at which an upper end of the rod can be fitted through the first annular member of the first bracket;

lowering the TV downwardly such that the upper end of the rod passes through the first annular member until the first annular member rests directly on top of the collar member, the collar member thereby supporting the TV; and securing the second annular member of the second bracket around the rod by transitioning the second annular member from the open configuration to the closed configuration.

2. The method of claim 1, wherein the second annular member comprises a first half-annular member and a second half-annular member configured to, in the closed configuration, match a cross-sectional size and shape of the rod.

3. The method of claim 1, wherein the rod comprises a cylindrical cross-section.

4. The method of claim 1, wherein the collar member is configured to be axially fixed on the rod by a fastener.

5. The method of claim 4, wherein the fastener comprises a screw.

6. The method of claim 1, wherein the first annular member of the first hanging arm comprises a contiguous, non-openable annular opening.

* * * * *